United States Patent

Stolz et al.

[11] 4,138,169
[45] Feb. 6, 1979

[54] TWO ROW ROLLING BEARING ASSEMBLY HAVING SINGLE PIECE INNER RING AND TWO PIECE OUTER RING

[75] Inventors: Robert Stolz, Schweinfurt; Walter Hahn, Schonungen, both of Fed. Rep. of Germany

[73] Assignee: SKF Industries, Inc., King of-Prussia, Pa.

[21] Appl. No.: 850,794

[22] Filed: Nov. 11, 1977

[30] Foreign Application Priority Data

Dec. 2, 1976 [DE] Fed. Rep. of Germany ....... 2654607

[51] Int. Cl.² .................. B60B 27/02; F16C 33/46
[52] U.S. Cl. ...................... 308/189 R; 308/194; 308/196; 308/201
[58] Field of Search ............... 308/189 R, 190, 191, 308/192, 193–198, 236, 233, 235, 201, 207 R, 210, 211, 213, 214, 216; 29/148.4 R, 148.4 A, 148.4 B, 148.4 C; 180/43 R

[56] References Cited

U.S. PATENT DOCUMENTS

| | | | |
|---|---|---|---|
| 1,340,250 | 5/1920 | Pruyn | 308/196 |
| 3,532,401 | 10/1970 | McKee | 308/195 |
| 4,066,304 | 1/1978 | Johnston et al. | 308/201 |

FOREIGN PATENT DOCUMENTS

| | | | |
|---|---|---|---|
| 455646 | 8/1913 | France | 308/195 |
| 180057 | 5/1922 | United Kingdom | 308/196 |

*Primary Examiner*—Trygve M. Blix
*Assistant Examiner*—Douglas C. Butler
*Attorney, Agent, or Firm*—Daniel M. Rosen

[57] ABSTRACT

A rolling bearing assembly has inner and outer members, rotatable with respect to one another, and defining a pair of races therebetween. Each of these members has a flange-shaped portion for mounting the respective member. A separate row of rolling bearings is provided in each of the races. The outer member is formed with separable ring-shaped portions defining the running surfaces of the two races, the separable portions forming an inwardly directed annular ridge under adjoining faces, so that the rolling elements abut the sides of the ridge. One of the rows of rolling bearings may have a substantially larger number of rolling elements than the other row.

7 Claims, 1 Drawing Figure

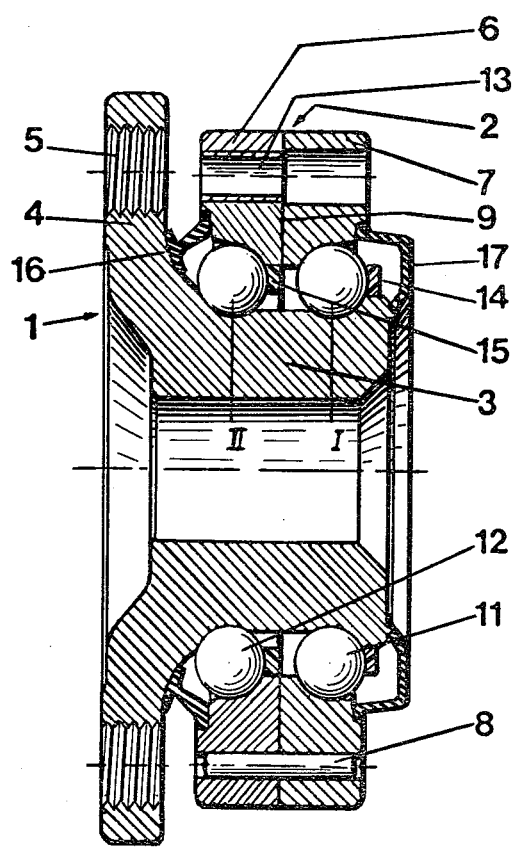

TWO ROW ROLLING BEARING ASSEMBLY HAVING SINGLE PIECE INNER RING AND TWO PIECE OUTER RING

BACKGROUND OF THE INVENTION

This invention relates to rolling bearing assemblies, and is particularly directed to that form of rolling bearing assembly having inner and outer members which are rotatable with respect to one another and define therebetween a pair of races for two rows of rolling bearings. In the type of bearing with which the invention is especially concerned, which is adaptable for use as a wheel bearing unit for a motor vehicle, each of the bearing parts has an outwardly extending portion to enable mounting of the respective bearing part to the desired portion of the motor vehicle.

One rolling bearing assembly of this type is disclosed in German Patent Publication No. 2,104,929. This bearing is designed especially for use on the wheels of a motor vehicle. For this purpose, the outer sections of the bearing parts are formed with flanges, so that one side of the bearing assembly may be connected to the motor vehicle by way of the flange on the outer bearing part. A wheel hub and brake element are mounted to the other side of the bearing assembly by means of the flange on the inner bearing part. In this arrangement, the bearing parts are formed by conventional techniques, whereby the inner bearing part must be inserted off-center into the outer bearing part, in order to enable loading of the rolling elements in the races. In this technique of assembly, the two rows of the rolling bearing generally comprise the same number of rolling elements.

Wheel bearing assemblies of this type are quite satisfactory, for example, for personnel motor vehicles. The bearing assemblies may also be employed on racing vehicles, although problems arise in this latter use of the bearing assemblies. In racing vehicles, the various wheels are arranged so that the force lines on the wheels do not coincide with the center planes of the bearing assembly. As a consequence, a turning moment acts on the bearing assembly, resulting in an additional stress, so that the outer lying rolling bearing rows may be loaded to a greater extent by the vehicle than the inner lying rolling bearing rows.

In order to overcome this problem, the present invention is directed to the provision of a compact, as well as easily produced roller bearing assembly of the above-described type, that is particularly useful as a bearing for wheels, such as racing motor vehicle wheels. The invention is further directed to the provision of rolling bearing assemblies which can be loaded, with relatively high forces, in both the axial and radial directions, while still having relatively small dimensions in comparsion with its load carrying capacity.

BRIEF SUMMARY OF THE INVENTION

In accordance with the invention, the above objective is achieved by providing a wheel bearing assembly wherein one of the bearing members is formed with a pair of separable elements having running tracks for separate rows of the rolling bearing elements. This feature enables assembly of the bearing, so that one of the rows of bearings may have a substantially larger number of rolling elements than the other, without the necessity of providing special loading grooves or the like for loading the assembly with the rolling elements.

The invention is also directed to a method for assembling such rolling bearing assemblies.

BRIEF DESCRIPTION OF THE DRAWING

In order that the invention will be more clearly understood, it will now be disclosed in greater detail with reference to the accompanying drawing, which is a cross-section of a bearing assembly in accordance with a preferred embodiment of the invention.

Referring now to the drawings, therein is illustrated a bearing assembly in accordance with the invention, formed of two bearing parts 1 and 2. In the illustrated example of the invention, these bearing parts 1 and 2 are formed as inner and outer rings respectively of a rolling bearing assembly. In order to simplify the following disclosure, these bearing parts 1 and 2 will be referred to in the following disclosure only as the "inner" ring 1 and the "outer" ring 2. The inner ring 1 has a substantially L-shaped cross-section, formed of the axially directed race portion 3, and a flange-shaped section 4 extending radially outwardly from one side of the race portion 3. Several tapped holes 5 are distributed about the circumference of the flange-shaped portion 4, in order to enable the affixing of the flange-shaped portion 4 to a wheel hub and brake (not shown) of a motor vehicle, for example, by means of threaded bolts (not shown).

The outer ring 2 is comprised of two ring-shaped elements 6 and 7, which are detachably connected together, for example, by a pair of diametrically opposite lying axially directed pins 8. In the drawing, only one pin 8 is shown extending in an axially directed hole 8a in the radially outer portion of the two ring elements 6,7 in order that the single figure of the drawing also show the mounting means for the outer ring. In other words, while the drawings shows mounting holes diametrically opposite the hole for the pin 8, it will be understood that, in reality the mounting holes may be circumferentially displaced from the diametrical plane of the pins 8. The pins 8 may be removed from the ring parts 6,7, and may, for example, be formed as dowel pins or other forms of pins adapted to be press fit in the holes.

The cross-sections of the ring elements 6 and 7 are mirror images of one another, as shown in the figure, and these rings are preferably ground together, in production, with the pins 8 holding them together. The axial center portion of the outer ring 2 has a radially inwardly extending ridge 9, formed in part in each of the ring elements 6 and 7, and this ridge in part forms a running surface or track for each of the ring elements 6 and 7. Thus, as illustrated in, FIG. 1, the rolling elements, in this case the balls 11,12, engage the two axial sides of the ridge 9, so the assembly can withstand axial loading.

In the outer portion of the outer ring 2, that is, in each of the ring elements 6 and 7, a pair of mounting holes 13 are provided distributed about the circumference, in order to enable the outer ring to be affixed to, for example, a motor vehicle. The holes 13 in the ring-shaped elements 6 and 7 are circumferentially aligned, and the mounting holes 13 in one of these ring-shaped elements, for example, the ring-shaped element 6 may be tapped as shown in the drawings, so that threaded bolts extending from the mounting part of the motor vehicle may extend first through the untapped holes in the ring-shaped element 7 and thence into the tapped-shaped portions of the holes 13 in the ring-shaped element 6. As a consequence, the bolts for mounting the bearing assembly to the motor vehicle also serve to rigidly hold the ring-shaped elements 6 and 7 together. It will, of course, be apparent that, in this arrangement, the threaded portions of the holes 13 are in that ring-shaped element toward the flange-shaped portion 4 of the inner ring 1.

As discussed above, two rows of rolling elements, such as balls, are arranged between the inner ring and the outer ring. For this purpose, a pair of races are formed in the inner and outer rings, with the annular race portion 3 of the inner ring having a pair of running tracks on its outer surface, and each of the ring elements 6 and 7 having a radially inwardly directed track aligned with a respective track of the inner ring 1. Accordingly, the rolling elements or balls 11 form together a first rolling body row I, and the rolling elements or balls 12 form together a second rolling body row II. The balls 11 of the rolling body row I are held in a cage 14, and the balls 12 of the rolling body row II are held together by a cage 15. In the preferred embodiments of the invention, the cages 14 and 15 are in the form of so-called "snap cages". In the arrangement in accordance with the invention, as will be discussed in greater detail in the following paragraphs, a number of balls 12 in the rolling body row II, that is, toward the flange of the inner ring, may be substantially larger than the number of balls 11 in the rolling body row I. Thus, the row of balls II may have twice as many balls as that of the row I. This feature enables the bearing assembly to safely be loaded with greater forces in the region of the rolling body row II.

The inner regions of the bearing assembly, between the rings 1 and 2, may be sealed by sealing rings 16 and 17, formed to the shape of the respective sides of the regions between the bearings, in accordance with conventional practice.

As discussed above, a portion of the running surface or track of the balls 11 and 12 for the outer ring is formed by the side surfaces of the inwardly extending ridge 9. Accordingly, the ball bearing assembly in accordance with the invention is an angular contact ball bearing.

In order to assemble the bearing assembly in accordance with the invention, the cage 15 may be first placed over the ring portion 3 of the inner ring. Then this cage is filled with the balls 12 of the row II. The ring element 6 may then be slipped over the ring portion 3, and over the row of balls II. The sealing ring 16 may, of course, be fit in position prior to the assembly of the ring element 6 over the ring portion 3.

The ring element 7 is then placed over the ring portion 3, and arranged to be off-center with respect to the ring portion 3. This results in the presentation of a crescent-shaped slit between the ring portion 3 and the ring element 7. The balls 11 of the first row of balls I are inserted in this slit. The ring element 7 is then centered with respect to the ring portion 3, by suitably moving some of the balls 11 around the respective race, and the cage 14 is then snapped over the balls 11. The ring elements 6 and 7 are then affixed together by means of the pins 8 to form the bearing assembly. Finally, the sealing ring 17 may be assembled, to complete the formation of the assembly. The thus formed bearing assembly, which may constitute a wheel bearing assembly, now forms a compact prefabricated unit.

In two row bearing assemblies, wherein the rings are not separable as in the bearing of the present invention, the balls may be loaded into the bearing by assembling the inner and outer rings to be off-center so that the balls of both rows may be inserted in the resulting crescent-shaped slits on both sides of the assembly. If this technique of loading is required, it is evident that the balls may be loaded in each of the races to extend only about 180° around the circumference of each race. Thus, when the balls are then distributed uniformly about the circumference of the respective race and held in position by the snap cages, it is apparent that each row may be only about half filled with balls. In the arrangement of the present invention, however, since the outer ring is formed of two ring elements, the first assembled ring element 6 may be substantially entirely filled with balls, while the limitation on the number of balls that can be loaded by off-center loading is applicable only to the second assembled ring element. Thus, in accordance with the invention, one of the rows of balls may have a substantially greater number of balls loaded therein than the other row, so that the bearing assembly, in the region of the row with the greater number of balls, can absorb greater loads. This enables the use of the bearing assembly in accordance with the invention in applications such as in racing vehicles, wherein off-center loads may be experienced. Further, due to the increase in the number of rolling elements such as balls in the bearing assembly, the bearing assembly in accordance with the invention is capable of withstanding greater loads, in general, than in previous bearing assemblies, also retaining a compact size. These results are achieved while still providing an easily produceable, compact structure. The increase in the number of balls does not require the provision of special loading grooves or the like, as in some known types of bearings.

It is also evident that, since the balls of the row II adjacent the mounting flange of the inner ring 3, are assembled prior to the placement of the outer ring in position, this flange does not interfere with the loading of the balls so that extension of the inner ring is not required in order to enable the assembly of the bearing assembly.

It is further evident that the bearing assembly in accordance with the invention may be advantageously formed as an angular contact ball bearing assembly, since the ridge 9 of the outer ring 2 may be formed in a simple manner, and does not interfere with the loading of the rolling bearing assembly in accordance with the invention. The ring elements 6 and 7 may have identical cross-sections as shown in the figure, to thereby further simplify the fabrication of a bearing assembly in accordance with the invention, the two ring elements 6 and 7 merely being assembled in mirror image fashion, to achieve the desired results. Accordingly, an angular contact ball bearing assembly is provided by a simple and inexpensive technique. Such construction is readily adaptable to mass production techniques, since the ring elements 6 and 7 may be held together by the pins 8 during grinding of the running tracks therein. As discussed above, the pins 8 may be conventional pins, or threaded fasteners.

While the invention has been disclosed and described with reference to a single embodiment, it will be apparent that variations and modifications may be made therein, and it is intended in the following claims to cover each such variation and modification as falls within the true spirit and scope of the invention.

What is claimed is:

1. In a rolling bearing assembly having first and second members relatively rotatable with respect to one another and defining first and second races therebetween, rolling elements in said races and defining first and second rows respectively of rolling elements, and means for mounting said first and second members; the improvement wherein said first member comprises first and second elements having ring-shaped portions defining running tracks for said first and second races, respectively, and means detachably holding said first and second elements together, said second member having a unitary portion on which running tracks for said first and second races are formed, said second member having a radially extending mounting flange on one side thereof, said first and second elements having aligned axially extending hole means distributed about their circumference for mounting said bearing assembly, the hole means of the one of said first and second elements toward said flange being threaded.

2. The rolling bearing assembly of claim 1, wherein said first and second members comprise outer and inner ring-shaped members respectively.

3. The rolling bearing assembly of claim 1, wherein said first and second elements define a radially extending ridge at the adjoining surface of said first and second elements, said ridge defining at least a portion of the running tracks of said first member, whereby said rolling elements engage the sides of said ridge, and said bearing assembly forms an angular contact ball bearing assembly.

4. The rolling bearing assembly of claim 3, wherein said rolling elements are balls.

5. The rolling bearing assembly of claim 3, wherein said first and second elements have substantially identical cross-sections, and are mounted in said bearing assembly in mirror image positions.

6. In a rolling bearing assembly having first and second members relatively rotatable with respect to one another and defining first and second races therebetween, rolling elements in said races and defining first and second rows respectively of rolling elements, and means for mounting said first and second members; the improvement wherein said first member comprises first and second elements having ring-shaped portions defining running tracks for said first and second races, respectively, and means detachably holding said first and second elements together, said second member having a unitary portion on which tracks for said first and second races are formed, and further comprising removable pin means mounted in axially extending hole means in said first and second elements for detachably holding said first and second elements together.

7. A method for assembling a rolling bearing assembly, comprising inserting rolling elements in a first cage aligned with a first running track on an annular portion of a first member, to provide a first row of rolling bearing elements, axially moving a second running track of a second member into alignment with said first running track to confine the rolling elements of said first row, then axially moving a third running track of a third member into alignment with a fourth running track of said first member to abut said second member, radially displacing said third member with respect to said first member to form a crescent-shaped slit, then loading rolling elements into said slit and realigning said third member to be coaxial with respect to said first member, snapping a cage onto said rolling elements loaded into said slit to form a second row of rolling bearing elements, and then detachably fixing said second and third members together.

* * * * *

UNITED STATES PATENT AND TRADEMARK OFFICE
CERTIFICATE OF CORRECTION

PATENT NO. : 4,138,169
DATED : 2/6/79
INVENTOR(S) : R. Stolz, et al

It is certified that error appears in the above-identified patent and that said Letters Patent are hereby corrected as shown below:

DETAILED DESCRIPTION OF THE DRAWINGS--.

Column 2, line 10 - Change "drawings" to --drawing--.

Column 2, line 36- Change "drawings" to --drawing--.

Column 2, line 51- Change "FIG. 1" to --the drawing--.

Column 2, line 63 - Change "drawings" to --drawing--.

Column 3, line 20 - Change "embodiments" to --embodiment--.

Signed and Sealed this

Twenty-fifth Day of March 1980

[SEAL]

Attest:

SIDNEY A. DIAMOND

Attesting Officer   Commissioner of Patents and Trademarks